US008311974B2

(12) United States Patent
Gong (10) Patent No.: US 8,311,974 B2
(45) Date of Patent: Nov. 13, 2012

(54) MODULARIZED EXTRACTION, TRANSFORMATION, AND LOADING FOR A DATABASE

(75) Inventor: Yu Gong, Half Moon Bay, CA (US)

(73) Assignee: Oracle International Corporation, Redwood Shores, CA (US)

( * ) Notice: Subject to any disclaimer, the term of this patent is extended or adjusted under 35 U.S.C. 154(b) by 474 days.

(21) Appl. No.: 10/783,779

(22) Filed: Feb. 20, 2004

(65) Prior Publication Data

US 2005/0187974 A1    Aug. 25, 2005

(51) Int. Cl.
*G06F 7/00*    (2006.01)
(52) U.S. Cl. ....................................................... 707/602
(58) Field of Classification Search ............... 707/104.1, 707/100, 10, 1, 3, 7, 602
See application file for complete search history.

(56) References Cited

U.S. PATENT DOCUMENTS

| 4,506,326 A | 3/1985 | Shaw et al. |
| 4,930,071 A | 5/1990 | Tou et al. |
| 5,222,235 A | 6/1993 | Hintz et al. |
| 5,278,978 A | 1/1994 | Demers et al. |
| 5,333,265 A | 7/1994 | Orimo et al. |
| 5,396,623 A | 3/1995 | McCall et al. |
| 5,454,101 A | 9/1995 | Mackay et al. |
| 5,454,102 A | 9/1995 | Tang et al. |
| 5,491,810 A | 2/1996 | Allen |

(Continued)

FOREIGN PATENT DOCUMENTS

EP    0 942 363 A2    9/1999

(Continued)

OTHER PUBLICATIONS

International Preliminary Examining Authority, "Notification of Transmittal of International Preliminary Report on Patentability," PCT/US2004/025805, dated Nov. 18, 2005, 16 pages.

(Continued)

*Primary Examiner* — Hosain Alam
*Assistant Examiner* — Eliyah S Harper
(74) *Attorney, Agent, or Firm* — Hickman Palermo Truong Becker Bingham Wong LLP (57) ABSTRACT

Techniques exporting data and metadata from a source database environment to a target database environment are provided. The techniques include the steps of analyzing metadata that describes one or more items, the data for which is in a source database, where the one or more items include at least one of a view, a sequence, a dimension, a cube, an ETL mapping, and any database object for which the metadata is stored outside of the source and target databases. The data for each item resides in a data file associated with the source database. The data for each item is incorporated into the target database based on the metadata by providing the target database access to an incorporated data file, where the incorporated data file is the data file or a copy thereof. Techniques are also provided for exporting database data from the source database. The techniques include extracting metadata that describes one or more items, the data for which is in the source database, where the one or more items include at least one of the structures described above. The data for each item resides in a data file associated with the source database. After the exporting, a database server that manages the target database is provided access to an incorporated data file, where the incorporated data file is the data file or a copy thereof.

32 Claims, 4 Drawing Sheets

U.S. PATENT DOCUMENTS

| | | |
|---|---|---|
| 5,551,020 A | 8/1996 | Flax et al. |
| 5,579,516 A | 11/1996 | Van Maren et al. |
| 5,687,343 A | 11/1997 | Fecteau et al. |
| 5,692,174 A | 11/1997 | Bireley et al. |
| 5,701,461 A | 12/1997 | Dalal et al. |
| 5,717,915 A | 2/1998 | Stolfo et al. |
| 5,758,345 A | 5/1998 | Wang |
| 5,781,911 A | 7/1998 | Young et al. |
| 5,787,445 A | 7/1998 | Daberko |
| 5,787,446 A | 7/1998 | Dang et al. |
| 5,787,471 A | 7/1998 | Inoue et al. |
| 5,819,254 A | 10/1998 | Kawai |
| 5,819,298 A | 10/1998 | Wong et al. |
| 5,822,749 A | 10/1998 | Agarwal |
| 5,832,509 A | 11/1998 | Mortis et al. |
| 5,864,853 A | 1/1999 | Kimura et al. |
| 5,870,746 A | 2/1999 | Knutson et al. |
| 5,890,167 A * | 3/1999 | Bridge et al. ............. 707/204 |
| 5,890,169 A | 3/1999 | Wong et al. |
| 5,924,097 A | 7/1999 | Hill et al. |
| 5,937,408 A | 8/1999 | Shoup et al. |
| 5,943,677 A | 8/1999 | Hicks |
| 5,951,694 A | 9/1999 | Choquier et al. |
| 5,970,502 A | 10/1999 | Salkewicz et al. |
| 5,991,753 A | 11/1999 | Wilde |
| 6,014,614 A | 1/2000 | Herring et al. |
| 6,014,670 A | 1/2000 | Zamanian et al. |
| 6,032,158 A | 2/2000 | Mukhopadhyay et al. |
| 6,035,298 A | 3/2000 | McKearney |
| 6,035,412 A | 3/2000 | Tamer et al. |
| 6,041,357 A | 3/2000 | Kunzelman et al. |
| 6,044,374 A | 3/2000 | Nesamoney et al. |
| 6,078,924 A | 6/2000 | Ainsbury et al. |
| 6,085,200 A | 7/2000 | Hill et al. |
| 6,088,728 A | 7/2000 | Bellemore et al. |
| 6,098,076 A | 8/2000 | Rekieta et al. |
| 6,101,497 A | 8/2000 | Ofek |
| 6,108,657 A | 8/2000 | Shoup et al. |
| 6,108,659 A | 8/2000 | Vincent |
| 6,108,748 A | 8/2000 | Ofek et al. |
| 6,122,636 A | 9/2000 | Malloy et al. |
| 6,151,601 A | 11/2000 | Papierniak et al. |
| 6,151,608 A | 11/2000 | Abrams |
| 6,195,662 B1 | 2/2001 | Ellis et al. |
| 6,208,990 B1 * | 3/2001 | Suresh et al. ...................... 1/1 |
| 6,222,840 B1 | 4/2001 | Walker et al. |
| 6,233,537 B1 | 5/2001 | Gryphon et al. |
| 6,247,008 B1 | 6/2001 | Cambot et al. |
| 6,249,786 B1 | 6/2001 | Wadewitz |
| 6,272,503 B1 | 8/2001 | Bridge et al. |
| 6,339,775 B1 | 1/2002 | Zamanian et al. |
| 6,434,558 B1 | 8/2002 | MacLeod et al. |
| 6,442,568 B1 | 8/2002 | Velasco et al. |
| 6,442,663 B1 | 8/2002 | Sun et al. |
| 6,442,748 B1 | 8/2002 | Bowman-Amuah |
| 6,453,038 B1 | 9/2002 | McFarlane et al. |
| 6,484,179 B1 | 11/2002 | Roccaforte |
| 6,490,590 B1 * | 12/2002 | Fink ......................... 707/602 |
| 6,516,326 B1 | 2/2003 | Goodrich et al. |
| 6,549,922 B1 * | 4/2003 | Srivastava et al. ............ 707/205 |
| 6,604,104 B1 | 8/2003 | Smith |
| 6,604,110 B1 | 8/2003 | Savage et al. |
| 6,611,838 B1 | 8/2003 | Ignat et al. |
| 6,615,217 B2 | 9/2003 | Rosensteel et al. |
| 6,643,652 B2 | 11/2003 | Helgeson et al. |
| 6,668,254 B2 | 12/2003 | Matson et al. |
| 6,691,155 B2 | 2/2004 | Gottfried |
| 6,694,306 B1 | 2/2004 | Nishizawa et al. |
| 6,694,505 B1 | 2/2004 | Tan |
| 6,721,727 B2 | 4/2004 | Chau et al. |
| 6,721,749 B1 | 4/2004 | Najm et al. |
| 6,757,689 B2 | 6/2004 | Battas et al. |
| 6,785,673 B1 | 8/2004 | Fernandez et al. |
| 6,792,431 B2 | 9/2004 | Tamboli et al. |
| 6,839,724 B2 | 1/2005 | Manchanda et al. |
| 6,920,443 B1 | 7/2005 | Cesare et al. |
| 6,978,282 B1 | 12/2005 | Dings et al. |
| 6,993,657 B1 | 1/2006 | Renner et al. |
| 6,996,566 B1 | 2/2006 | George et al. |
| 7,024,656 B1 | 4/2006 | Ahad |
| 7,031,987 B2 | 4/2006 | Mukkamalla et al. |
| 7,051,334 B1 | 5/2006 | Porter et al. |
| 7,058,615 B2 * | 6/2006 | Yao ................. 706/12 |
| 7,058,958 B1 | 6/2006 | Shutt et al. |
| 7,103,590 B1 | 9/2006 | Murthy et al. |
| 7,139,779 B1 * | 11/2006 | Kornelson et al. ..................... 1/1 |
| 7,139,979 B2 * | 11/2006 | Schultz et al. ................ 715/763 |
| 7,143,112 B2 * | 11/2006 | Yagawa ............................... 1/1 |
| 7,181,493 B2 | 2/2007 | English et al. |
| 7,254,590 B2 * | 8/2007 | Mudunuri et al. ..................... 1/1 |
| 7,257,594 B2 | 8/2007 | Tamboli et al. |
| 7,272,816 B2 | 9/2007 | Schulz et al. |
| 7,296,238 B1 | 11/2007 | Zurawski |
| 7,299,216 B1 * | 11/2007 | Liang et al. ........................... 1/1 |
| 7,487,168 B2 | 2/2009 | Rys et al. |
| 7,512,614 B2 * | 3/2009 | Yao ..................................... 1/1 |
| 7,596,573 B2 * | 9/2009 | O'Neil et al. ......................... 1/1 |
| 2001/0016843 A1 | 8/2001 | Olson et al. |
| 2001/0047270 A1 | 11/2001 | Gusick et al. |
| 2001/0047372 A1 | 11/2001 | Gorelik et al. |
| 2002/0046301 A1 | 4/2002 | Shannon et al. |
| 2002/0073019 A1 | 6/2002 | Deaton |
| 2002/0073139 A1 | 6/2002 | Hawkins et al. |
| 2002/0091702 A1 | 7/2002 | Mullins |
| 2002/0116213 A1 | 8/2002 | Kavounis et al. |
| 2002/0116457 A1 | 8/2002 | Eshleman et al. |
| 2002/0138316 A1 | 9/2002 | Katz et al. |
| 2002/0143733 A1 | 10/2002 | Mukkamalla et al. |
| 2002/0156796 A1 | 10/2002 | Hisamatsu et al. |
| 2002/0161896 A1 | 10/2002 | Wen et al. |
| 2002/0169745 A1 | 11/2002 | Hotti et al. |
| 2002/0174000 A1 | 11/2002 | Katz et al. |
| 2002/0174093 A1 | 11/2002 | Casati et al. |
| 2003/0005028 A1 | 1/2003 | Dritschler et al. |
| 2003/0140055 A1 | 7/2003 | Doney et al. |
| 2003/0172158 A1 | 9/2003 | Pillai et al. |
| 2003/0204752 A1 | 10/2003 | Garrison |
| 2003/0208505 A1 | 11/2003 | Mullins et al. |
| 2003/0212789 A1 | 11/2003 | Hamel et al. |
| 2003/0236834 A1 | 12/2003 | Gottfried |
| 2004/0034615 A1 * | 2/2004 | Thomson et al. ................. 707/1 |
| 2004/0034669 A1 | 2/2004 | Smith et al. |
| 2004/0064487 A1 | 4/2004 | Nguyen et al. |
| 2004/0068509 A1 | 4/2004 | Garden et al. |
| 2004/0073567 A1 | 4/2004 | Pelon |
| 2004/0088297 A1 | 5/2004 | Coates et al. |
| 2004/0091114 A1 | 5/2004 | Carter et al. |
| 2004/0153459 A1 | 8/2004 | Whitten et al. |
| 2004/0182225 A1 | 9/2004 | Ellis et al. |
| 2004/0205452 A1 | 10/2004 | Fitzsimons et al. |
| 2004/0215584 A1 * | 10/2004 | Yao ................. 706/12 |
| 2004/0260696 A1 * | 12/2004 | Matsuoka et al. ................ 707/5 |
| 2005/0015386 A1 | 1/2005 | Mortensen et al. |
| 2005/0125436 A1 * | 6/2005 | Mudunuri et al. ............ 707/102 |
| 2005/0131970 A1 * | 6/2005 | Salazar et al. ................ 707/205 |
| 2005/0235271 A1 | 10/2005 | Sanyal et al. |
| 2005/0256908 A1 | 11/2005 | Yang et al. |
| 2007/0179939 A1 * | 8/2007 | O'Neil et al. ...................... 707/4 |

FOREIGN PATENT DOCUMENTS

| | | |
|---|---|---|
| EP | 0 992 909 A2 | 4/2000 |
| EP | 1 170 662 A2 | 1/2002 |
| WO | WO 02/05116 A2 | 1/2002 |
| WO | WO 02/07037 A | 1/2002 |
| WO | WO 02/097676 A2 | 12/2002 |
| WO | WO 03/014928 A2 | 2/2003 |
| WO | WO 03/062983 A2 | 7/2003 |

OTHER PUBLICATIONS

Wickremesinghe et al., "Distributed Computing With Load-Managed Active Storage", Proceedings of the 11th IEEE International Symposium, 2002, pp. 13-23.

Wiederhold et al., "Consistency Control of Replicated Data in Federated Databases", Jul. 12, 1990, IEEE, pp. 130-132.

R. Hugo Patterson et al., "Informed Prefetching and Caching", *ACM* 1995, pp. 79-95.

Pascal Aubry, Thierry Gautier, "GC: the Data-Flow Graph Format of Synchronous Programming", IRISA/INRIA, EP-ATR team of Association of Computing Machinery, 1995, p. 83-93, IR'95, 1/95, San Francisco, CA, USA.

Vetterli, Thomas, "A Comparison of OIM with CWM", Publication through SMART, Oct. 19, 1999, 11 pages.

Hill, S. et al., "Strategic Analysis Report", Data Transformation: Key to Information Sharing, Sep. 29, 1998, 60 pages.

"Optimizing Development Productivity Using UML in Oracle9iJ Developer," Oracle, Dec. 2001, 21 pages.

"UML Distilled Applying the Standard Object Modeling Language", Martin Fowler et al., 1997, whole book.

"Object-Oriented Modeling and Design," James Rumbaugh et al, Nov. 14, 1990, pp. 366-396.

The State Intellectual Property Office of P.R.C., "Notification of the Second Office Action", foreign application No. 200480023059.7, dated Aug. 22, 2008, 4 pages.

Claims, foreign application No. 200480023059.7, 5 pages.

Gunther, Oliver et al., "MMM: A Web-Based System for Sharing Statistical Computing Modules," May-Jun. 1997, IEEE, vol. 1 Issue 3, pp. 59-68.

Kurakawa, Kei et al., "Life Cycle Design on Environmental Information Sharing," Environmentally Conscious Design and Inverse Manufacturing 1999, Proceedings EcoDesign '99, Feb. 1999, IEEE, pp. 138-142.

Shiva, S.G., et al., "Modular Description/Simulation/Synthesis Using DDL," 19th Design Automation Conference 1982, IEEE Press, pp. 321-329.

Spiegler, Israel, "Automating Database Construction," ACM SIGMIS Database, vol. 14, Issue 3, Spring 1983, pp. 21-29.

Current Claims of International Application No. PCT/US2004/025805, 8 pages.

International Searching Authority, "Notification of Transmittal of the International Search Report and the Written Opinion of the International Searching Authority, or the Declaration," dated Dec. 3, 2004, 12 pages.

Spalding Office Systems, "DocuWare Document Server Specifications," Sep. 2, 2003, http://web.archive.org/web/20030902215629/http://spaldingoffice.com/includes/static-documents/site/docuData/docserverspec.htm/, retrieved on Feb. 6, 2007, 2 pages.

Naude, Frank, "Oracle FAQ: Glossary of Terms," Feb. 28, 2001, http://web.archive.org/web/20010228061218/http://www.orafaq.com/glossary/faqlosr.htm, retrieved on Feb. 6, 2007, 3 pages.

Microsoft Corporation, Migrating your Access Database to Microsoft SQL Server 7.0, Feb. 1999, http://msdn2.microsoft.com/en-us/library/aa226083(sql.70).aspx, retrieved on Feb. 6, 2007, 8 pages.

Software Resource International, "Application Migration Services," Aug. 5, 2002, http://www.softresint.com/pub/SPD/01-04-012.pdf, 2 pages.

Swierk, Edward et al., "The Roma Personal Metadata Service," Oct. 2001, http://.hpl.hp.com/personal/Mary_Baker/publications/ROMA-WMCSA2000.pdf, pp. 1-10.

International Searching Authority, "Notification of Transmittal of the International Search Report and the Written Opinion of the International Searching Authority, or the Declaration," PCT/US2004/026389, Aug. 4, 2005, 13 pages.

Jeffrey S. Chase et al., "Dynamic Virtual Clusters in a Grid Site Manager," Proceedings of the 12th IEEE International Symposium on High Performance Distributed Computing (HPDC'03), 2003, IEEE, pp. 90-100.

European Patent Office, "International Preliminary Report on Patentability," Aug. 26, 2005, International Application No. PCT/US2004/026570, 9 pages.

International Searching Authority, "Notification of Transmittal of the International Search Report and the Written Opinion of the International; Searching Authority, or the Declaration," PCT/US2004/026445, Aug. 25, 2005, 12 pages.

International Searching Authority, "Notification of Transmittal of the International Search Report and the Written Opinion of the International Searching Authority, or the Declaration," PCT/US2004/026405, Jan. 6, 2006, 13 pages.

Henry Song et al., "Browser State Repository Service," Lecture Notes in Computer Science, vol. 2414, 2002, pp. 1-14, XP002904339.

Eric Skow et al., "A Security Architecture for Application Session Handoff," 2002, IEEE International Conference Proceedings, Apr. 28-May 2, 2002, vol. 1 or 5, pp. 2058-2063, XP010589848.

Claus Hagen, et al., "Highly Available Process Support Systems: Implementing Backup Mechanisms," 1999, IEEE, pp. 112-121.

IBM Corp., "Conditional Container Reuse for Database and Tablespace Restore," IBM Technical Disclosure Bulletin, vol. 39, No. 12, Dec. 1996, XP-002240529, pp. 199-200.

R. W. Dey, et al., IBM Corp., "Data Space Manager," IBM Technical Disclosure Bulletin, vol. 25, No. 11A, Apr. 1983, XP-000714243, pp. 5456-5459.

Oracle Corporation, "Advanced Analytic Services," 1996-2001, Oracle9i Warehousing Guide, Release 1 (9.0.1), Part No. A90237-01, http://download-west.oracle.com/docs/cd/A91202_01/901_doc/server.901/a90237, data retrieved Aug. 6, 2004, pp. 1-5.

Oracle Corporation, "Transforming Tables into Multidimensional Data Structures," 1996-2001, Oracle9i OLAP Services Concepts and Administration Guide, Release 1 (9.0.1), Part No. A88755-01, http://download-west.oracle.com/docs/cd/A91202_01/901_doc/olap.901/a88755/, data retrieved Aug. 6, 2004, pp. 1-3.

Oracle Corporation, "Understanding the OLAP API," 1996-2001, Oracle9i OLAP Services Concepts and Administration Guide, Release 1 (9.0.1), Part No. A88755-01, http://download-west.oracle.com/docs/cd/A91202_01/901_doc/olap.901/a88755/, data retrieved Aug. 6, 2004, pp. 1-3.

Oracle Corporation, "Controlling the Flow of Execution," 1996-2001, Oracle9i OLAP Services Developer's Guide to the OLAP DML, Release 1 (9.0.1), Part No. A86720-01, http://download-west.oracle.com/docs/cd/A91202_01/901_doc/olap.901/a86720/, data retrieved Aug. 6, 2004, pp. 1-4.

Current Claims in PCT application, International Application No. PCT/US03/23747, 14 pages.

International Searching Authority, "Notification of Transmittal of the International Search Report or the Declaration," dated May 25, 2004, 6 pages.

Kei Kurakawa et al., "Life Cycle Design Support Based on Environmental Information Sharing," IEEE, Feb. 1-3, 1999, Proceedings EcoDesign '99, First International Symposium, pp. 138-142.

Oliver Gunther, et al., "MMM: A Web-Based System for Sharing Statistical Computing Modules," IEEE, May-Jun. 1997, vol. 1, Issue 3, pp. 59-68.

Database Journal, "Oracle—Datawarehousing (ETL) Enhancements in Oracle 9i", dated Aug. 20, 2001, Copyright 2007 Jupitermedia Corporation, 5 pages.

Bernhard Atzenberger, et al., "Data Warehouse Performance Enhancements with Oracle9i", Oracle Corporation, Apr. 2001, 36 pages.

Oracle Corporation, "Oracle9*i* Application Server: Business Intelligence Technical Overview," Jun. 2003, An Oracle White Paper, http://otn.oracle.com/products/bi/pdf/bi_overview.pdf, pp. 1-13.

Oracle Corporation, "ETL Processing with Oracle9*i*," Jun. 2001, An Oracle White Paper, http://otn.oracle.com/products/bi/pdf/bi_overview.pdf, pp. 1-18.

Oracle Corporation, "Oracle9*i* for e-Business: Business Intelligence," Jun. 2001, An Oracle White Paper, http://otn.oracle.com/products/oracle9i/pdf/o9i_bi_twp.pdf, pp. 1-18.

Oracle Corporation. "Oracle 9*i* Warehouse Builder, Architectural White paper" Jan. 2003, http://otn.oracle.com/products/warehouse/pdf/OWB_Architecture_WhitePaper.pdf, pp. 1-16.

* cited by examiner

MODULARIZED EXTRACTION, TRANSFORMATION, AND LOADING FOR A DATABASE

RELATED APPLICATIONS

The present application is related to the following applications:

U.S. patent application Ser. No. 08/852,968 entitled "Pluggable Tablespaces for Database Systems," filed by William H. Bridge, Jr., Jonathan D. Klein, J. William Lee, Juan R. Loaiza, Alex Tsukerman, Gianfranco Putzolu filed on May 8, 1997 (issued as U.S. Pat. No. 5,890,167 on Mar. 30, 1999; referred to as '167), the contents of which are hereby incorporated by reference in its entirety for all purposes; and U.S. patent application Ser. No. 08/865,693 entitled "Tablespace-relative database pointers," filed by William H. Bridge, Jr., Jonathan D. Klein, J. William Lee, Juan R. Loaiza, Alex Tsukerman, Gianfranco Putzolu filed on May 30, 1997, (issued as U.S. Pat. No. 6,272,503 on Aug. 7, 2001; referred to as '503), the contents of which are hereby incorporated by reference in its entirety for all purposes.

FIELD OF THE INVENTION

The present invention relates to database systems. The invention specifically relates to extraction, transformation, and loading for a database.

BACKGROUND OF THE INVENTION

Many organizations store information critical to their operations in one or more databases. In the complex environments in which these databases operate, it is often necessary to either archive the database for backup and later retrieval or to replicate full or partial databases from one location to another. Both of these operations, replication and archival/retrieval, involve extraction and loading of data and metadata from a "source" database into a "target" database.

A first approach for exporting data to a target database, referred to herein as the "database link approach", uses database links. Under this approach, a target database uses a reference or link to a particular set of data in lieu of storing the data itself. The reference allows the data to remain at a source database while treating the data as part of the target database. A problem with this approach is that when a query accesses the linked data as part of the target database, the data must be retrieved from the source database—requiring the data to be transported over a network one piece at a time. The piecemeal transport causes extensive network, time, and processing overhead.

A second approach for exporting data is the command and data generation approach. In the command and data generation approach, a file of insert commands is generated, one for each record to be exported from the source database. The insert commands conform to a standard database language, such as structure query language (SQL) or any other appropriate format. To import the data, the insert commands are executed at the target database, thereby loading into the target database all of the data from the file of insert commands. A problem with the command and data generation approach is that executing an insert command for each exported record is an extremely slow process. Another problem with the approach is that the export file is subject to file size limitations imposed by the operating system. This means that the command and data generation approach does not work in the case where the aggregate amount of data and metadata exceed a certain predefined limit. A third problem with this approach is that not all types of metadata can be exported from the source database and imported into the target database. In particular, the method cannot handle metadata that can be stored external to the database. Consequently, database application users must transport data and metadata separately using many different tools. It is normally a tedious and error-prone process.

Another approach for extraction and loading of database data is the use of transportable tablespaces (TTS): referred to herein as the "TTS approach". A "tablespace" is a collection of storage containers (e.g. data files) used to store data for database objects (e.g. relational tables). In the TTS approach, tablespaces are exported from a source database and imported into a target database. This capability allows the data files of a tablespace to be copied or transported to a database server managing the target database using operating system utilities and allows the data in the data files to be loaded into the database simply by incorporating data files into the set of data files used by the database for storing data. The TTS approach runs much faster than the database link and command and data generation approaches. A problem with the TTS approach is that not all types of metadata associated with the data in the tablespace is transported. In particular, the method cannot extract or load metadata that can be stored external to the database. Consequently, database application users must transport data and metadata separately using many different tools. It is normally a tedious and error-prone process.

Another approach is the database connection approach. The database connection approach uses processes that extract, transform, and load data from a source database into a target database. The database connection approach works by extracting data row-by-row from the source database, transmitting that data over a network connection from the source database to the target database, transforming the data into a format appropriate for the target database, and loading the data into the target database. One problem with this approach is that it is very slow, primarily because the data for each row is transmitted separately. Another problem with this approach is that not all types of metadata are transported to the target database. In particular, the method cannot extract or load metadata that can be stored external to the database. This lack of ability to transport certain types of metadata is undesirable for many database applications. Consequently, database application users must transport data and metadata separately using many different tools. It is normally a tedious and error-prone process.

Therefore there is clearly a need for a method for loading database data into a target database, which allows the efficient and automatic transport of metadata and any associated data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for loading database data into a target database is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL SUMMARY

Consider a source database environment and a target database environment each including a database and two applications communicatively coupled to the database: a metadata manipulation application (MMA) and an extraction, transform, and loading (ETL) application. The MMA and ETL applications allow one to add, delete, and modify the data and metadata in the corresponding database. The metadata for each application resides in a location accessible to the MMA and ETL applications, respectively.

In order to extract database data and metadata from the source database environment and load the data and metadata into the target database environment, the metadata stored in the source database and the source applications is extracted to one or more files. The data associated with the extracted metadata, typically stored in one or more data files at the source database, is made available to the target database along with the extracted metadata. For example, copies of the files containing the data and metadata could be transported via file transfer protocol (FTP) to the target environment. Once the target database server or a process thereto communicatively coupled has access to the files containing the data and metadata, either to the original files or to copies thereof, the target database server analyzes the metadata and incorporates the data in the data files into the target database by informing the target database server of the location of the data files. The target database server or the process thereto communicatively coupled also incorporates the metadata into the target database and the ETL and MMA applications as appropriate. For example, data from a source database, a metadata description of a table (containing the data) from the source database metadata, and a metadata description of a view of that table from a source MMA are transported via FTP to a target database environment. Once at the target database environment, the metadata is analyzed and the table is added to the target database, the view is added to the target MMA, and the corresponding data is made available to the target database by informing the target database of the location of the data files. Given that the data files are in the target database's native format or one interpretable by the target database server, knowing the location is all that is needed to enable the target database server to access the data from the data files.

In many cases, at least some of the items to which the metadata correspond will have data associated with them. In some cases, however, the metadata will not have corresponding metadata. In cases where there is no data corresponding to the metadata, the metadata itself is still incorporated into the target database environment and the step of making the data files available to the target database will either not be performed or the data files will be empty.

In various embodiments described herein, the operations can be performed as a single atomic operation. That is, a full set of data and metadata can be stored at a source environment, transported to a target environment, and incorporated into the target environment as a single atomic operation, allowing the operation to be rolled back if unsuccessful. In various embodiments of the techniques described herein, the transportation of the data is automatic: a user of the system need only provide a specification for the transportation, which may include names and locations of all the data and metadata; then the system validates the transportation specification, and if the specification is valid, it performs the actual data and metadata transportation without further user intervention.

Various novel techniques are described herein for extraction and loading of database data and metadata. For the sake of exposition, an example embodiment is described below. Specifics and possible alternatives are given as part of the example embodiment. These specific details in no way limit the present invention, but instead provide illustrations intended to aid understanding.

DEFINITIONS

View: A view is a logical table defined by a query, where the logical table may be referred to in database commands as a table. The logical table is treated as having the columns returned by the query.

Sequence: A sequence is a set of non-overlapping identifiers. Each identifier provided based on a sequence is guaranteed to be distinct from ever other identifier provided based on the sequence Dimension: A dimensions is a categorization of data in the database table. Each category in a dimension can be subcategorized by another dimension.

Cube: A cube is a logical organization of data containing multiple dimensions. The "edges" of the cube are defined by contained dimensions. Cells in the cube are definable by a value for each dimension in the cube. Each cell contains values.

ETL: Extraction, Transformation, and Loading of data from one data location to another.

ETL Mapping: is a data flow specification detailing which source data impacts which target data and can comprise a reference or link to data that resides outside of the database.

Database catalog: one of many locations where metadata about database data is stored.

Transportable tablespace: is a tablespace that can be copied from one database and plugged into another. This is described further in '167.

Queue: a queue is a storage and dispatching mechanism for applications to communicate that allows applications to communicate in an orderly fashion.

External table: an external table is a table whose metadata resides in the database and whose data is external to the database.

Stored procedures: A stored procedure is a program that is stored in the database as metadata. It can be called by database applications.

System Overview

Figure 1:
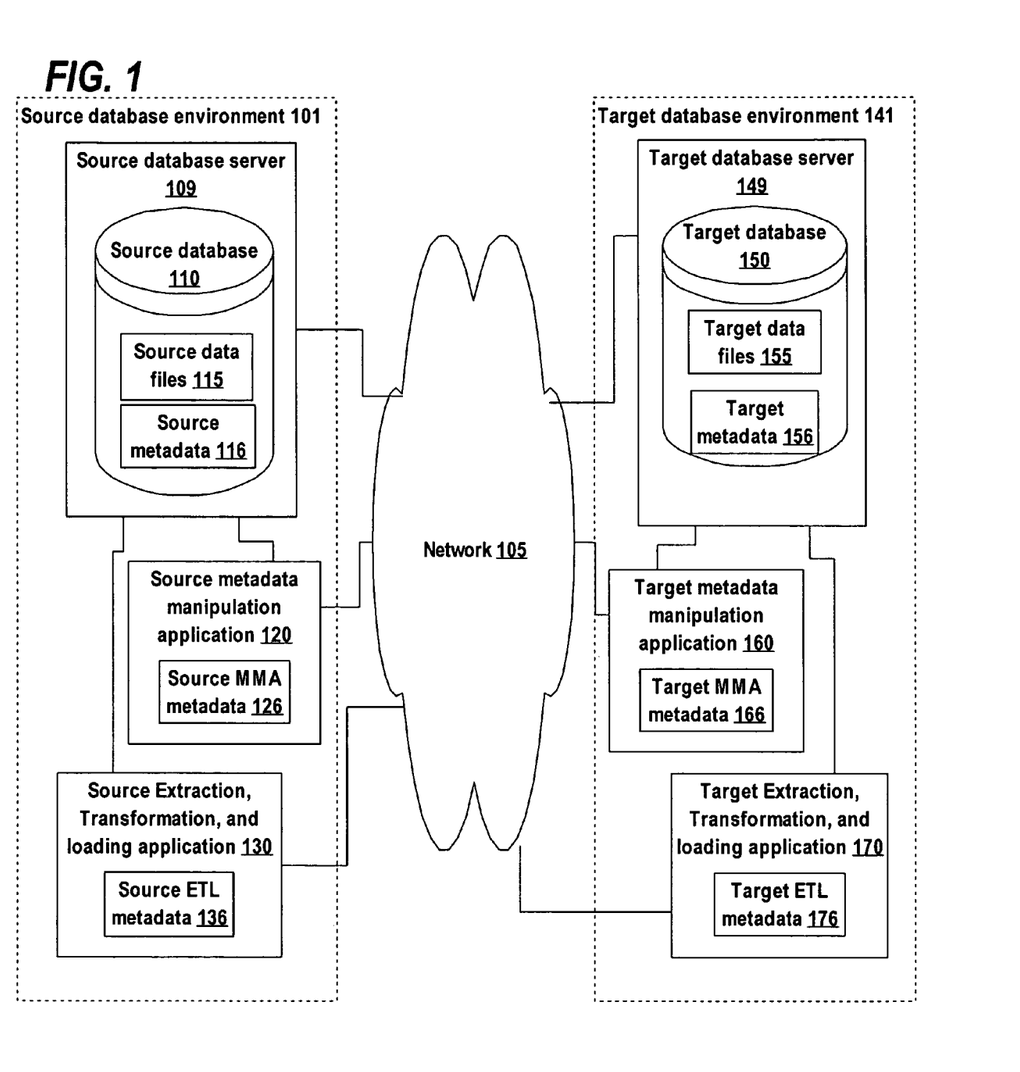
FIG. 1 is a block diagram that depicts an example system for loading database data into a target database according to one embodiment of the invention.

FIG. 1 is a block diagram that depicts an example system for loading database data into a target database according to one embodiment of the invention.

The system comprises a network 105 that is communicatively coupled to a source database server 109, a source metadata manipulation application 120, a source extraction transform and loading application 130, a target database server 149, a target metadata manipulation application 160, and a target extraction transform and loading application 170. The network 105 can include a wireless network, dial up access medium, the Internet, a local area network (LAN), or any other appropriate communication network.

The source database server 109, source MMA 120, source ETL 130 are part of the source database environment 101. The target database server 149, target MMA 160, target ETL application 170 are part of the target database environment 141.

Source Database Environment

A database server, such as the source database server 109 and the target database server 149, is a combination of a set of integrated software components and an allocation of computational resources, such as memory and processes for executing the set of integrated software components on a processor, where the combination of software and computational resources are used for managing a database. Among other functions of database management, a database server governs and facilitates access to a database, processing requests by database clients to access the database. The database clients of a database server may include other database servers.

In this example, the source database server 109 manages a single source database 110. Source database 110 and target database 150 are a collection of database objects, the data for which is stored in data files 115 and 155, respectively. The database objects may be any form of structured data. Structured data is data structured according to a metadata description defining the structure. Structured data includes relational tables, object tables, object-relational tables, and bodies of data structured according to the Extensible Markup Language ("XML"), such as XML documents.

The databases 110, 150 include data stored in data files 115, 155 and database metadata 116, 156, respectively. The database metadata 116, 156 describe core database objects in the databases 110, 150. Herein the term "core database objects" refers to tables, indexes, constraints, or any other appropriate database object whose metadata resides inside of the database so that a database server managing the database can access the database and maintain the integrity of the database. The term "extended database objects" refers to, for example, a database view, a database sequence, a database dimension, a database cube, an ETL mapping, or a database object, where the metadata for the database object can be stored outside of the source database 110 and the target database 150. The term "database objects" refers to both core database objects and extended database objects.

The databases 110, 150 are each stored in one or more data files 115, 155. The database metadata 116, 156 define what data files 115, 155 store data for a particular core database object. The data files 115, 155 can be located on a Unix file system, a machine-readable medium, or other appropriate storage mechanism communicatively coupled to the database servers 109, 149. Data files 115 and 155 can also be tablespaces and can be integrated into tablespaces as described in '167 and '503.

The source database server 109 is communicatively coupled to a source metadata manipulation application 120. A metadata manipulation application, such as the source MMA 120 and the target MMA 160, has its own metadata, 126 and 166, respectively, and is a program for viewing, creating, or changing data in the data files (115, 155, respectively), the database metadata (116, 156, respectively), the MMA metadata (126, 166, respectively), or the ETL metadata (136, 176, respectively). An MMA describes one or more extended database objects, the data for which resides in an associated database (110, 150, respectively).

Source MMA 120 and target MMA 160 could each be a single process running on one or more processors on a single computer, multiple processes running on one or more processors on a single computer, or multiple processes running on two or more computers. In other examples, there might be no source MMA 120 or target MMA 160 or each MMA could be part of database servers 109, 149, respectively.

The source database server 109 is also communicatively coupled to a source extraction transformation, and loading application 130. An ETL application, like source ETL application 130 and target ETL application 170, comprises ETL metadata (136, 176, respectively). The source ETL application 130 is a program for extracting, loading, or transforming data associated with the source database 110. The target ETL application 170 is a program for extracting, loading, or transforming data associated with the target database 150. The ETL metadata 136, 176 for each ETL application 130, 170 describes one or more extended database objects. The ETL metadata 136, 176 can be stored outside of the source database 110 and the target database 150. The ETL applications 130,170 can each be a process running on one or more processors on a single computer, multiple processes running on one or more processors on a single computer, or multiple processes running on two or more computers. In other examples, there might be no ETL applications 130, 170 or the ETL applications 130, 170 could be part of the respective database servers 109, 149.

Target Database Environment

The target database server 149 manages the target database 150. The target database server 149 is communicatively coupled to a target metadata manipulation application 160 and a target extraction transformation, and loading application 170. The target MMA 160 and target ETL application 170 are described above.

Loading Database Data and Metadata into a Target Database Environment

Figure 2:
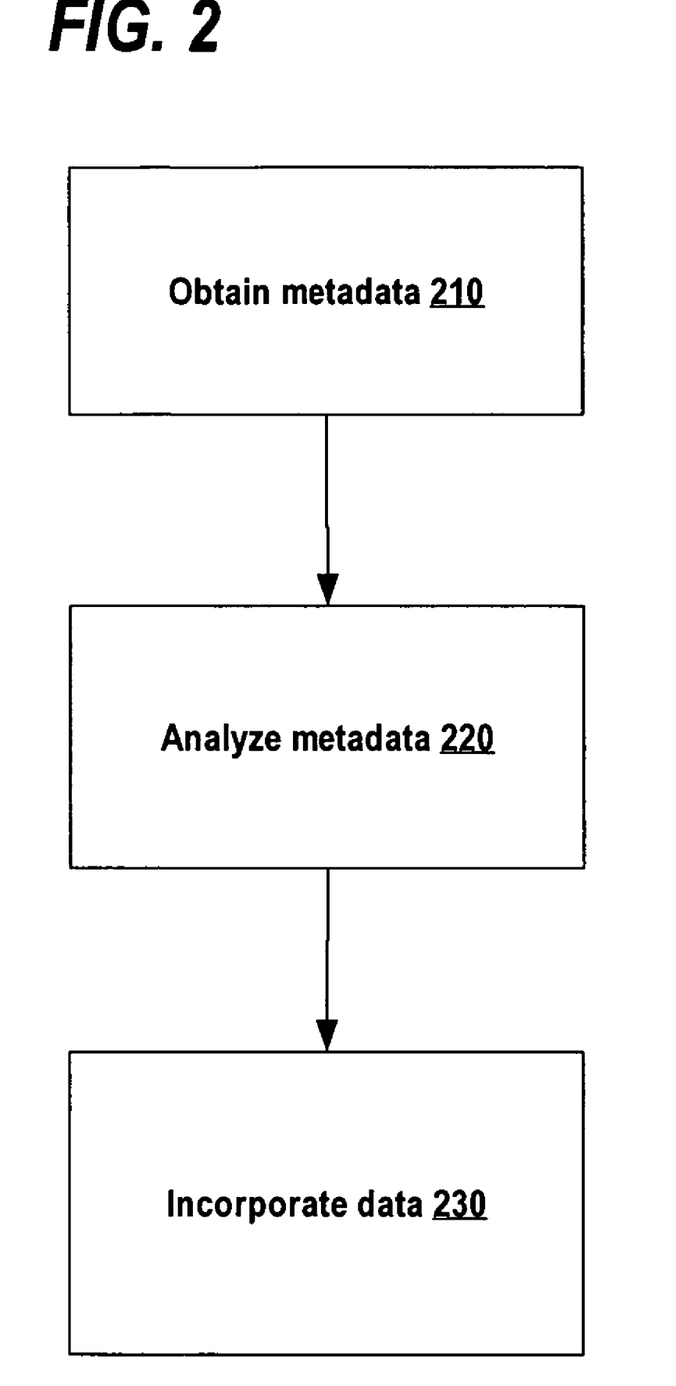
FIG. 2 is a flow diagram that depicts a process for automatically loading database data into a target database according to one embodiment of the invention.

FIG. 2 is a flow diagram that depicts a process for automatically loading database data into a target database according to one embodiment of the invention. In the example herein, the target ETL application 170 is performing the steps described herein. It is not critical, however, what application performs the steps. The target MMA 160, the target database server 149, or any other appropriate application could perform the some or all of the steps, and the steps could be performed by a single application or multiple applications.

First, metadata must be obtained, step 210. In this example, the metadata is stored in one or more files. In other examples, the data could be stored in one or more data structures in memory or in the database itself. The metadata that is transported could include a portion of any or all of the following: source metadata 106, source MMA metadata 126, and source ETL metadata 136. Generally, the metadata is obtained via file transfer protocol (FTP), hypertext transfer protocol (HTTP), secure HTTP (HTTPS), rsync, or over a network using another appropriate protocol. Target ETL application 170 could also read at least a portion of the metadata from a machine-readable medium while the machine-readable medium resides at a location communicatively coupled to the target ETL application 170 and where the metadata was recorded to the machine-readable medium at a location communicatively coupled to the source ETL application 130. A specific example is a target ETL application 170 obtaining metadata from a source ETL application 130 using FTP.

Once the metadata is obtained, it is analyzed in step 220. In this example, the step 220 of analyzing the metadata includes determining what database objects are represented in the metadata by parsing the file in which the metadata is transported, and recording that information in an internal data structure at the target ETL application 170. The metadata includes one or more definitions of one or more database objects from the source metadata 106, the source MMA metadata 126, and the source ETL metadata 136.

In one embodiment, as part of obtaining metadata in step 220, an associated extraction process stores source data files 115 on accessible machine-readable medium, at a host location other than the source environment 101 or the target environment 141, or on a portable machine-readable medium such as compact disks or tapes. In a related embodiment, the machine-readable medium is accessible to the target ETL application 170 and allow the ETL application 170 to have direct access to the extracted source data.

For example, in the context of FIG. 1, a target ETL application 170 analyzes a file containing:
source database metadata 116 from a source database 110, where the source database metadata 116 includes core database objects;
source MMA metadata 126 associated with a source MMA 120, wherein the source MMA metadata 126 describes one or more extended database objects, the data for which is in a source database 110; and
source ETL metadata 136 associated with a source ETL application 130, wherein the source ETL metadata 136 describes one or more extended database objects, the data for which is in a source database 110.

Once the metadata is analyzed in step 220, the data associated with the metadata is incorporated in step 230. The metadata being analyzed in step 220 describes one or more database objects the data for which is in a source database 110, and the one or more database objects reside in one or more source data files 115 associated with the source database 110. Herein, the term "source data files" are defined as the original source data files 115 located on the source database 110, or a copy thereof. In some cases, the copy of the source data files 115 are included in or replace the target data files 155. In any case, the copies of the source data files 115, whether or not they are considered target data files 155, are herein termed source data files 115.

The source data files 115 are in a format that is understandable by the target database 150. In some cases the format of the source data files 115 is native to both the source database 110 and the target database 150. In other cases, the source data files 115 are in a compatible, but non-native format that is readable, i.e. interpretable, by the target database server 149, even though it is not the target database's 150 native format. The target database server 149 accomplishes this kind of format independence by running a section of code capable of interpreting the data in the non-native format of the source data files 115 in place of the code that is capable of interpreting the data in a format native to the target database 150. In either case (native or non-native format), the data in the source data files 115 is incorporated into a target database 150 by providing the target database server 149 access to the source data files 115 and by signifying location of the source data files 115 to the target database server 149.

Once the target database server 149 accesses the source data files 115 associated with the metadata analyzed in step 220, the target database server 149 can read and manipulate the data included in the source data files 115.

As part of incorporating the data in step 230, the target database metadata 156, the target MMA metadata 166, and the target ETL metadata 176 are all augmented as appropriate. For example, if data associated with a database sequence is loaded into the target database 150, and the metadata for that database sequence was from the source MMA metadata 126, then the metadata for that database sequence is incorporated into the target MMA metadata 166. Incorporation of metadata into the target metadata 156, target MMA metadata 166, and target ETL metadata 176 can be performed using any appropriate interface. For example, the target database server 149 might have a special interpreter to incorporate the metadata directly from the file containing the source database metadata 116. The target MMA 166 and target ETL application 170 could have application program interfaces (APIs) for adding the metadata.

In one embodiment, as part of incorporating the data in step 230, the target ETL application 170, invokes the target database's transportable tablespace mechanism to "plug in" the data and thus create the tablespace in the target database 150. As the result of creating the tablespaces, all tables' data and metadata appear in target database 150. However, at this point, the extended metadata has not been created in the target database environment 141.

In one embodiment, if no data is associated with the source database metadata 116, source MMA metadata 126, or source ETL metadata 136, then no data associated with the metadata is incorporated as part of step 230.

The example described in FIG. 2 enables analysis and incorporation of metadata and data into a target database 150, and thereby, enables efficient loading of data and complex metadata from source database 110, source MMA 120, and source ETL application 130.

Extracting Database Data and Metadata from a Source Database Environment

Figure 3:
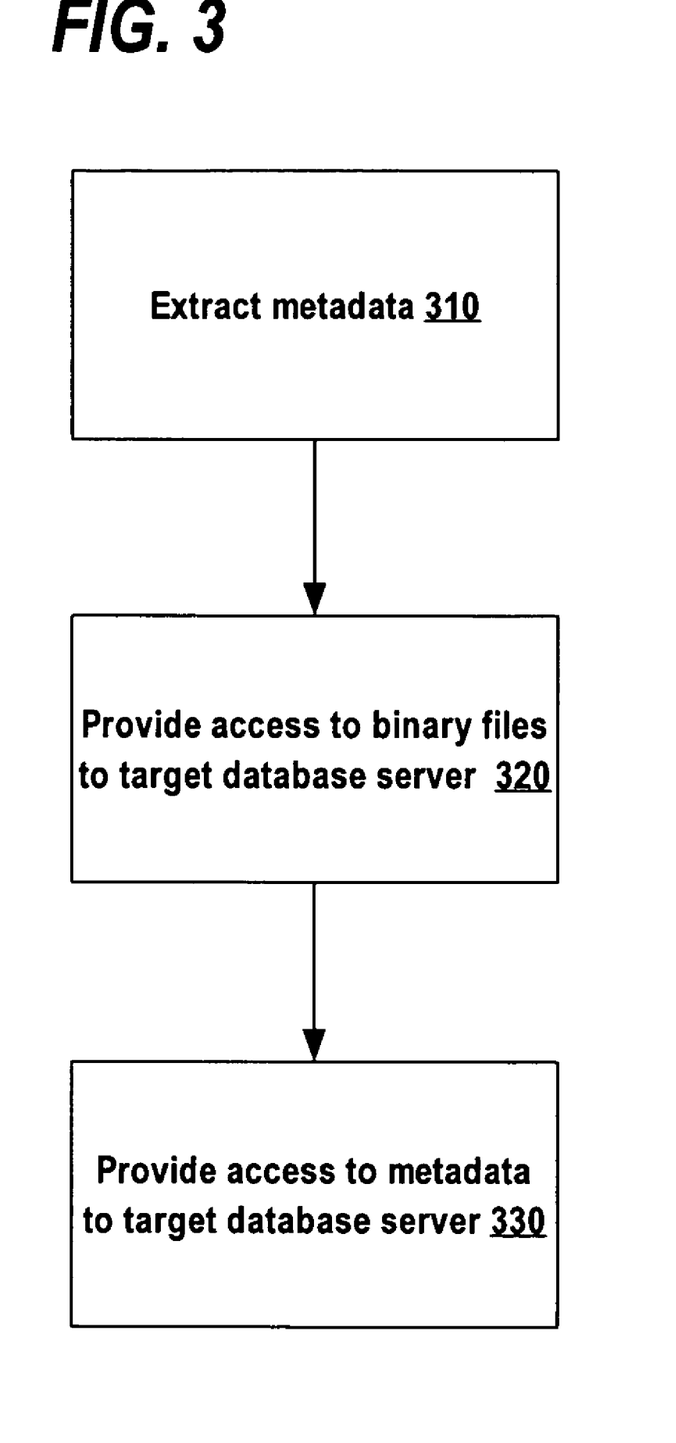
FIG. 3 is a flow diagram that depicts a process for automatically extracting database data from a source database according to one embodiment of the invention.

FIG. 3 is a flow diagram that depicts a process for automatically extracting database data from a source database according to one embodiment of the invention.

First, the metadata is extracted, step 310. In this example, a human operator signifies what metadata to extract via a graphical user interface to the source ETL application 130. The source ETL application then uses an API to the source database server 109 and the source MMA 120 to extract the appropriate data and metadata. In other examples, any operator, human or automated, specifies to any process communicatively coupled to the source database server 109, including the source MMA 120, to extract the data and metadata as described herein. The extracted metadata describes one or more database objects, the data for which resides in one or more source data files 115 associated with said source database 110. The metadata that is transported could include metadata from any or all of the following: source metadata 106, source MMA metadata 126, and source ETL metadata 136. In this example, the extracted metadata is stored in one or more files. In other examples, the data could be extracted and stored in one or more data structures in memory or in a database.

In one embodiment, as part of step 310, the metadata are analyzed for dependencies in order ensure that no dangling references exist. For example, if a view is present in the extracted metadata, but the tables are required to define the view are not included in the module, the view is removed from the metadata. In one embodiment, the dependencies in the metadata are also analyzed to ensure proper order of loading into the target database.

In one embodiment, as part of step 310, meta-metadata is created to represent the transportable tablespace that contains data (i.e., a set of tablespaces and metadata). This meta-metadata is created by the source ETL application 130 and is stored in memory data structures on the source database server 109. In a related embodiment, this meta-metadata is saved into one or more files and later imported into target ETL application 170. In a related embodiment, source and target ETL applications, when loaded with the meta-metadata for the transportable module are able to load the data associated with the meta-metadata.

In step 320, the source data files 115 are made accessible to the target database server 149. The files can be made available via FTP, HTTP, HTTPS, rsync, or over a network using another appropriate protocol. Making the data available could also be accomplished by causing a machine-readable medium to bear the data, e.g. writing the data to a compact disk (CD), and making that machine-readable medium accessible to the target database server 149. For example, a source ETL app 130 extracts source data files 115 from a source database 110 and makes the data files available to a target ETL application 170 via FTP. The target ETL application 170 subsequently makes the data files available to a target database server 149. In one embodiment, if no data is associated with the source database metadata 116, source MMA metadata 126, or source ETL metadata 136, then target database server 149 are not provided access to any source data files 115. In another embodiment, if no data is associated with the source database metadata 116, then target database server 149 are is provided access to empty source data files 115.

In various embodiments, as part of step 320, metadata from source metadata 116, source MMA metadata 126, or source ETL metadata 136, are saved in one or more files. In a related embodiment, the one or more files contain the metadata of objects such as views, dimensions, sequences, etc. In a related embodiment, the file is prepared for transportation to target machine and for later loading into target metadata 156, target MMA metadata 166, or target ETL metadata 176.

In step 330, access to the metadata extracted in step 310 is made available to the target ETL application 170. In this example, the target ETL application 170 analyzes and inputs the metadata. In other examples, a process communicatively coupled to the target database server 149 analyzes and inputs the metadata, and, in such examples, the metadata would be made available to that process.

As noted above, the metadata can be stored either in a file or in memory. If the metadata is stored in a file, access to it can be provided by transporting it to a location accessible to the target ETL application 170 via FTP, HTTP, HTTPS, rsync, or over a network using any appropriate protocol. It is also possible to cause a machine-readable medium to bear the data, e.g. writing the data to a CD, and making that machine-readable media accessible to the target ETL application 170. If the metadata is stored in memory, then it can be made available to the target ETL application in any appropriate manner including remote procedure calls and Transmission Control Protocol/Internet Protocol (TCP/IP) sockets.

For example, a source ETL application 130 provides a target ETL application 170 access to metadata extracted in step 310 by transporting, via FTP, a copy of the extracted metadata to location accessible to the target ETL application 170.

The example depicted in FIG. 3 enables extraction and delivery of data and metadata from a source database 110 to a target database 150, and extraction and delivery of metadata from applications in a source database environment 101 to those in a target database environment 141. The extraction of data and metadata enabled by the example in FIG. 3 combined with the loading enabled by the example in FIG. 2 provide an efficient method for extraction of data and metadata for core and extended database objects from a source database environment 101 and loading of that data and metadata into the target database environment 141 not possible previously.

Hardware Overview

Figure 4:
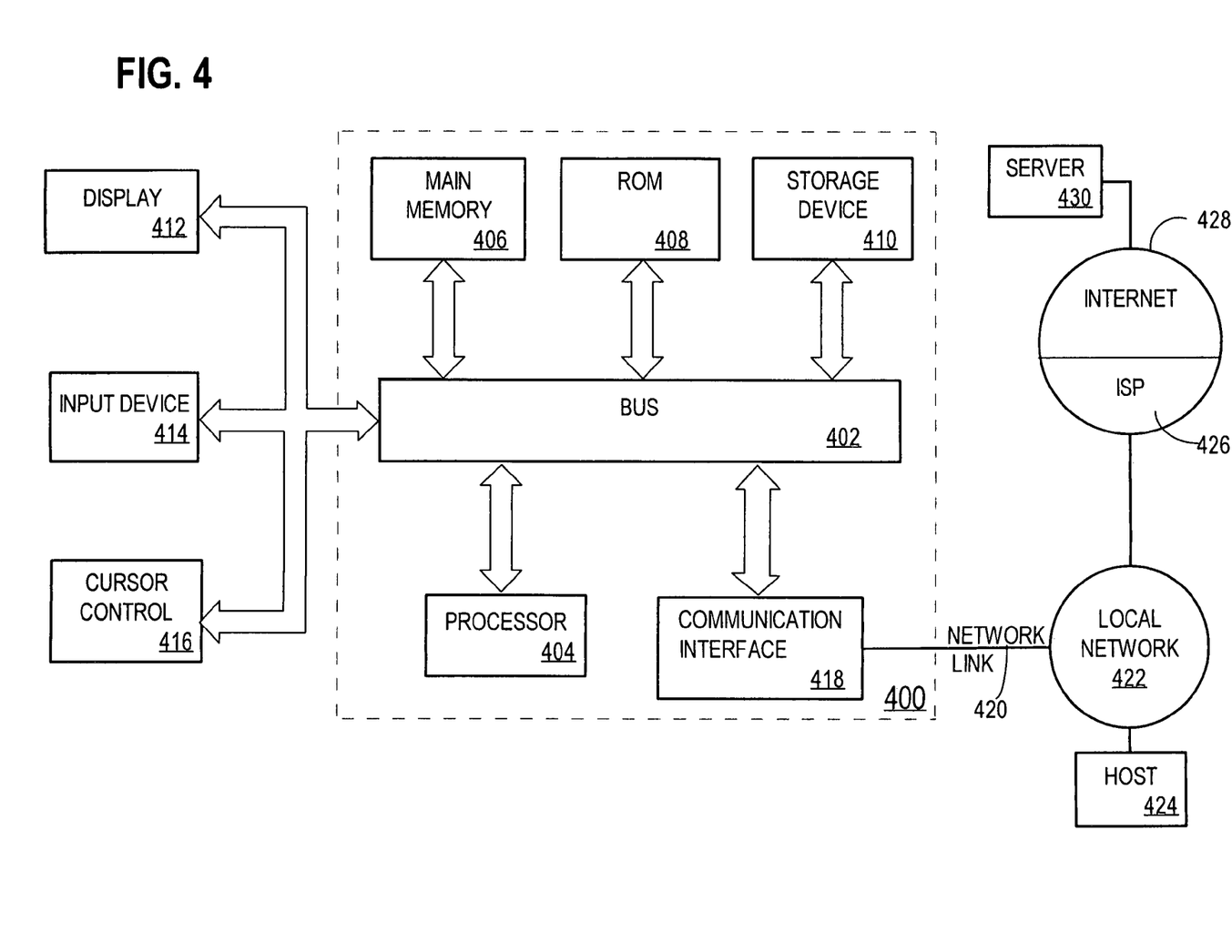
FIG. 4 is a block diagram that illustrates a computer system upon which an embodiment of the invention may be implemented according to one embodiment of the invention.

FIG. 4 is a block diagram that illustrates a computer system 400 upon which an embodiment of the invention may be implemented according to one embodiment of the invention. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer implemented method comprising:

a source ETL application receiving, from a user, input that selects one or more database objects to be transported from a source database to a target database;

wherein said source database includes source database metadata that describes a structure of database objects of said source database;

wherein said source database metadata identifies a set of tablespaces that store data for the one or more database objects to be transported, and said set of tablespaces is in a format that is understandable by the target database;

wherein said source ETL application includes source ETL metadata, separate from said source database metadata, that describes said structure of said database objects of said source database;

said source ETL application causing generation of a module comprising metadata that describes a structure of said one or more database objects of said source database;

a target ETL application reading said module;

wherein said target database includes target database metadata that describes a structure of database objects of said target database;

wherein said target ETL application includes target ETL metadata, separate from said target database metadata, that describes said structure of said database objects of said target database;

wherein reading said module causes said target ETL application to perform:

modifying said target ETL metadata based on said source ETL metadata read from said module to describe said structure of said one or more database objects of said target database; and modifying said target database metadata based on said metadata read from said module to describe a structure of said one or more database objects of said source database;

a target database system incorporating a copy of said set of tablespaces that store said data for at least one of said one or more database objects, wherein incorporating said copy of said set of tablespaces includes modifying the target database metadata to define said copy of said set of tablespaces as a set of tablespaces that are used to store said data for said at least one of said one or more database objects, wherein the method is performed by one or more computing devices.

2. The method of claim 1, further comprising:
in response to a failure occurring during the loading of said database objects within said target database, rolling back all changes made during the loading of the database objects to the target database.

3. The method of claim 1, wherein the selected one or more database objects to be transported from a source database to a target database includes a database object that has metadata stored outside of the source database.

4. The method of claim 1, wherein generation of a module includes analyzing the source database metadata for dependencies.

5. The method of claim 4, wherein analyzing the source database metadata for dependencies includes ensuring proper order of loading of the source database metadata into the target database.

6. The method of claim 1, further comprising:
storing said module in one or more files in a source file system.

7. The method of claim 6, further comprising:
said target ETL application performing:
reading a specification containing information for how to move modules from said source file system to a target file system;
wherein said information comprises a network protocol and the location in the source file system of said one or more files; and
accessing said one or more files in a source file system based on said information.

8. The method of claim 7, wherein the network protocol is one of FTP, HTTP, HTTPS, or rsync.

9. A computer implemented method comprising:
a source external application receiving, from a user, input that selects one or more database objects, wherein said one or more database objects include an internal database object to be transported from a source database to a target database and an external database object to be transported to a target external application;
wherein said source database includes source database metadata that describes a structure of said internal database object of said source database;
wherein said source database metadata identifies a set of tablespaces that store data for the one or more database objects to be transported, and said set of tablespaces is in a format that is understandable by the target database;
wherein said source external application includes source external application metadata, separate from said source database metadata, that describes said one or more database objects;
said source external application causing generation of a module comprising metadata that describes a structure of said one or more database objects;
a target external application reading said module;
wherein said target database includes target database metadata that describes said structure of said internal database object;
wherein said target external application includes target external metadata, separate from said target database metadata, that describes said one or more database objects; and wherein said reading said module causes said target external application to perform loading said one or more database objects within said target database and said target external application, wherein loading includes:
modifying said target external metadata to describe said one or more database objects; and
modifying said target database metadata to define a copy of said set of tablespaces as a set of tablespaces that are used to store said data for at least one of said one or more database objects;
wherein the method is performed by one or more computing devices.

10. The method of claim 9, wherein generation of a module includes analyzing the source database metadata for dependencies.

11. The method of claim 10, wherein analyzing the source database metadata for dependencies includes ensuring proper order of loading of the source database metadata into the target database.

12. The method of claim 9, further comprising:
storing said module in one or more files in a source file system.

13. The method of claim 12, further comprising:
said target ETL application performing:
reading a specification containing information for how to move modules from said source file system to a target file system; and
wherein said information comprises a network protocol and the location of said one or more files; and
accessing said one or more files in a source file system based on said information.

14. The method of claim 13, wherein the network protocol is one of FTP, HTTP, HTTPS, or rsync.

15. The method of claim 9, further comprising:
in response to a failure occurring during the loading of said database objects within said target database, rolling back all changes made during the loading of the database objects to the target database.

16. The method of claim 9, wherein said one or more database objects to be transported from a source database to a target database includes a database object that has metadata stored outside of the source database.

17. A non-transitory computer-readable storage medium storing one or more sequences of instructions which, when executed by one or more processors, causes the one or more processors to perform:
a source ETL application receiving, from a user, input that selects one or more database objects to be transported from a source database to a target database;
wherein said source database includes source database metadata that describes a structure of database objects of said source database;
wherein said source database metadata identifies a set of tablespaces that store data for the one or more database objects to be transported, and said set of tablespaces is in a format that is understandable by the target database;
wherein said source ETL application includes source ETL metadata, separate from said source database metadata, that describes said structure of said database objects of said source database;
said source ETL application causing generation of a module comprising metadata that describes the structure of said one or more database objects of said source database;
a target ETL application reading said module;

wherein said target database includes target database metadata that describes a structure of database objects of said target database;
wherein said target ETL application includes target ETL metadata, separate from said target database metadata, that describes said structure of said database objects of said target database;
wherein reading said module causes said target ETL application to perform:
modifying said target ETL metadata based on said source ETL metadata read from said module to describe said structure of said one or more database objects of said target database; and
modifying said target database metadata based on said metadata read from said module to describe the structure of said one or more database objects of said source database;
a target database system incorporating a copy of said set of tablespaces that store said data for at least one of said one or more database objects, wherein incorporating said copy of said set of tablespaces includes modifying the target database metadata to define said copy of said set of tablespaces as a set of tablespaces that are used to store said data for said at least one of said one or more database objects.

18. The non-transitory computer-readable storage medium of claim 17,
further comprising instructions which, when executed by one or more processors, causes the one or more processors to perform:
in response to a failure occurring during the loading of said database objects within said target database, rolling back all changes made during the loading of the database objects to the target database.

19. The non-transitory computer-readable storage medium of claim 17,
wherein the selected one or more database objects to be transported from a source database to a target database includes a database object that has metadata stored outside of the source database.

20. The non-transitory computer-readable storage medium of claim 17,
wherein generation of a module includes analyzing the source database metadata for dependencies.

21. The non-transitory computer-readable storage medium of claim 20,
wherein analyzing the source database metadata for dependencies includes ensuring proper order of loading of the source database metadata into the target database.

22. The non-transitory computer-readable storage medium of claim 17,
further comprising instructions which, when executed by one or more processors, causes the one or more processors to perform:
storing said module in one or more files in a source file system.

23. The non-transitory computer-readable storage medium of claim 22,
further comprising instructions which, when executed by one or more processors, causes the one or more processors to perform:
said target ETL application reading a specification containing information for how to move modules from said source file system to a target file system;
wherein said information comprises a network protocol and the location in the source file system of said one or more files; and
said target ETL application accessing said one or more files in a source file system based on said information.

24. The non-transitory computer-readable storage medium of claim 23,
wherein the network protocol is one of FTP, HTTP, HTTPS, or rsync.

25. A non-transitory computer-readable storage medium storing one or more sequences of instructions which, when executed by one or more processors, causes the one or more processors to perform:
a source external application receiving, from a user, input that selects one or more database objects, wherein said one or more database objects include an internal database object to be transported from a source database to a target database and an external database object to be transported to a target external application;
wherein said source database includes source database metadata that describes a structure of said internal database object of said source database;
wherein said source database metadata identifies a set of tablespaces that store data for the one or more database objects to be transported, and said set of tablespaces is in a format that is understandable by the target database;
wherein said source external application includes source external application metadata, separate from said source database metadata, that describes said one or more database objects;
said source external application causing generation of a module comprising metadata that describes a structure of said one or more database objects;
a target external application reading said module;
wherein said target database includes target database metadata that describes said structure of said internal database object;
wherein said target external application includes target external metadata, separate from said target database metadata, that describes said one or more database objects; and
wherein said reading said module causes said target external application to perform loading said one or more database objects within said target database and said target external application, wherein loading includes:
modifying said target external metadata to describe said one or more database objects; and
modifying said target database metadata to define a copy of said set of tablespaces as a set of tablespaces that are used to store said data for at least one of said one or more database objects.

26. The non-transitory computer-readable storage medium of claim 25,
wherein generation of a module includes analyzing the source database metadata for dependencies.

27. The non-transitory computer-readable storage medium of claim 26,
wherein analyzing the source database metadata for dependencies includes ensuring proper order of loading of the source database metadata into the target database.

28. The non-transitory computer-readable storage medium of claim 25,
further comprising instructions which, when executed by one or more processors, causes the one or more processors to perform:
storing said module in one or more files in a source file system.

29. The non-transitory computer-readable storage medium of claim 28, further comprising instructions which, when executed by one or more processors, causes the one or more processors to perform:
said target ETL application reading a specification containing information for how to move modules from said source file system to a target file system;
wherein said information comprises a network protocol and the location of said one or more files; and
said target ETL application accessing said one or more files in a source file system based on said information.

30. The non-transitory computer-readable storage medium of claim 29,
wherein the network protocol is one of FTP, HTTP, HTTPS, or rsync.

31. The non-transitory computer-readable storage medium of claim 25,
further comprising instructions which, when executed by one or more processors, causes the one or more processors to perform:
in response to a failure occurring during the loading of said database objects within said target database, rolling back all changes made during the loading of the database objects to the target database.

32. The non-transitory computer-readable storage medium of claim 25, wherein said one or more database objects to be transported from a source database to a target database includes a database object that has metadata stored outside of the source database.

* * * * *

UNITED STATES PATENT AND TRADEMARK OFFICE
CERTIFICATE OF CORRECTION

| | | |
|---|---|---|
| PATENT NO. | : 8,311,974 B2 | Page 1 of 1 |
| APPLICATION NO. | : 10/783779 | |
| DATED | : November 13, 2012 | |
| INVENTOR(S) | : Gong | |

It is certified that error appears in the above-identified patent and that said Letters Patent is hereby corrected as shown below:

In column 4, line 40, after "sequence" insert -- . --.

Signed and Sealed this
Fifth Day of February, 2013

Teresa Stanek Rea
*Acting Director of the United States Patent and Trademark Office*